United States Patent [19]
Jones

[11] 3,786,908
[45] Jan. 22, 1974

[54] ARTICLE HANDLING DEVICE

[75] Inventor: Charles H. Jones, Lunemburg, Mass.

[73] Assignee: Van Brode Milling Co., Inc., Clinton, Mass.

[22] Filed: Sept. 1, 1972

[21] Appl. No.: 285,876

[52] U.S. Cl. .......................................... 198/33 AB
[51] Int. Cl. ............................................ B65g 47/24
[58] Field of Search ... 198/33 AB, 33 AD; 214/1 Q; 193/43 R, 43 C, 43 D

[56] References Cited
UNITED STATES PATENTS
2,538,408   1/1951   Baker............................ 198/33 AD Primary Examiner—Edward A. Sroka

[57] ABSTRACT

An article handling device for turning an article moving along a conveyor, so that the longitudinal dimension of the article is oriented from a position perpendicular to the direction of motion to a position parallel to the direction of motion; a downstream gate cams the article around and is pushed out of the path of motion; the movement of the gate draws a following gate over the conveyor for final orientation of the article.

9 Claims, 4 Drawing Figures

ARTICLE HANDLING DEVICE

BACKGROUND OF THE INVENTION

It is often necessary, when dealing with long articles moving on a conveyor belt or the like, to reorient the article from a position in which the longitudinal dimension is prependicular or angular to the direction of motion to a position in which the longitudinal dimension is parallel to the direction of motion. This orientation is important in the case of a box which is to be printed or filled. It is also important when a high box must move up a steep section of the conveyor. By reorienting the box, the center of gravity is reoriented also and the box is less likely to roll down the slope and spill its contents. The equipment used for this turning operation in the past has involved either a complex combination of levers, hydralic servos, and sensors, or a simple fixed off-centered obstruction. The former arrangement was not only expensive and hard to adjust for articles of various sizes, but also prone to mechanical failure. The latter, simply did not perform the operation dependably. These and other difficulties experienced with the prior art devices have been obviated in a novel manner by the present invention.

It is, therefore, an outstanding object of the invention to provide an article handling device which will turn an article, moving on a conveyor, from a position in which the articles long axis is perpendicular to the direction of motion, to a position in which the long axis is parallel to the direction of motion.

Another object of this invention is the provision of an article handling device which reorients an article on a conveyor, using only the power of the moving article.

A further object of the present invention is the provision of an article handling device which is easily adjustable and thereby useful over a wide range of articles.

It is another object of the instant invention to provide an article handling device which is easily installed on existing conveying equipment.

A still further object of the invention is the provision of an article handling device whose operation involves simple positive-acting motions which are not prone to failure.

It is a further object of the invention to provide an article handling device which is simple, efficient, and durable.

With this and other objects in view, as will be apparent to those skilled in the art, the invention resides in the combination of parts set forth in the specification and covered by the claims appended hereto.

SUMMARY OF THE INVENTION

This invention involves a device for reorienting an article moving on a conveyor so that the long axis of the article is moved from a position where it is perpendicular to the line of motion to a position where it is parallel to the line of motion. The device involves an off-center obstructing gate which is pushed away from the path of the article, as the article contacts it, and as the gate cams the article partly around. The action of the obstructing gate draws a following gate into action and the two gates coordinate to complete the turning operation.

BRIEF DESCRIPTION OF THE DRAWINGS

The character of the invention, however, may be best understood by reference to one of its structural forms, as illustrated by the accompanying drawings, in which.

DESCRIPTION OF THE PREFERRED EMBODIMENT

Figure 1:
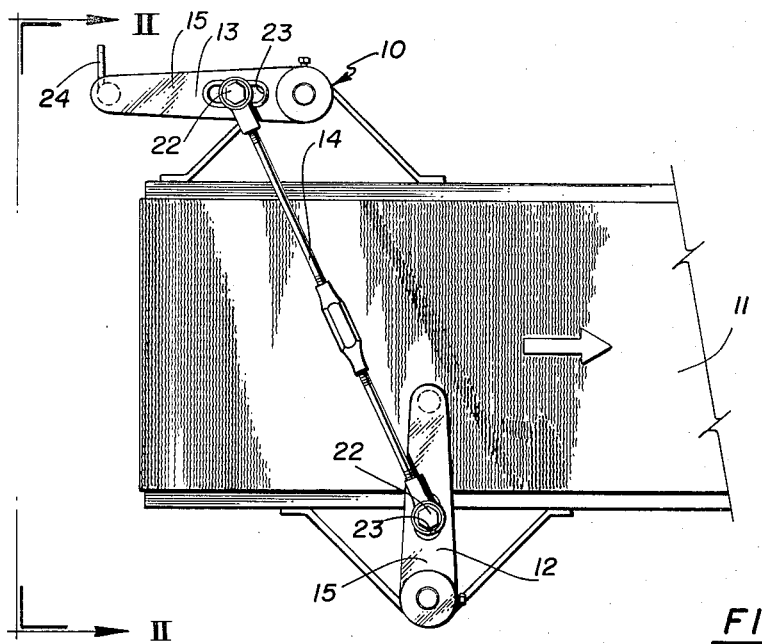
FIG. 1 is a plan view of a device embodying the principles of the present invention, and fitted to a conveyor belt.
Figure 2:
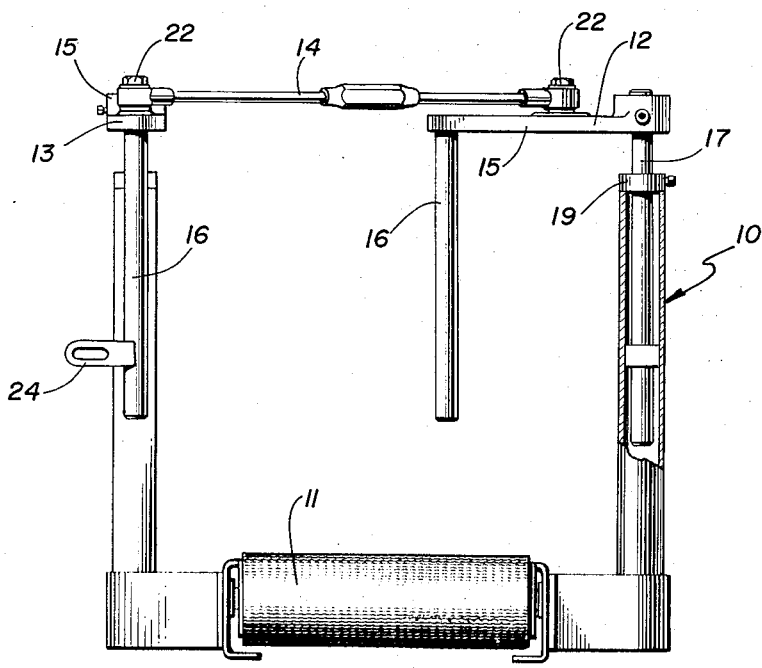
FIG. 2 is a front elevation view of the device.
Figure 3:
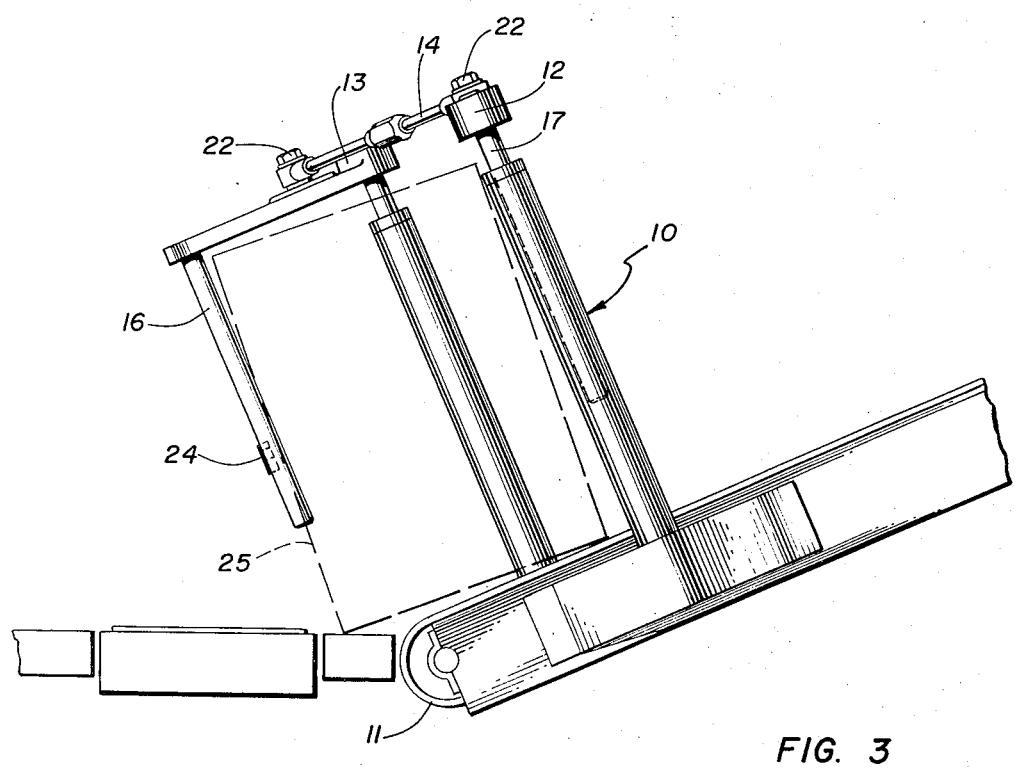
FIG. 3 is a side elevation view of the device.

Referring first to FIG. 1, wherein are best shown the general features of the invention, the article handling device, indicated generally by the reference numeral 10, is shown positioned around a conveyor belt 11. The device consists of two manipulators shown as an obstructing gate 12 and a following gate 13; joined by a connector, shown as rod 14. Each gate consists of an arm 15, having two vertical members 16 and 17 at each end, and a pivot post 18, in which the arms are pivotally mounted. The pivot posts are fixed to the conveyor bed. The height of the gates above the conveyor belt is adjusted by moving collars 19 along the outer vertical members 17. The gates are biased toward the position shown in FIG. 1 by spring 20, or by gravity as in FIG. 3, where the belt is sloped. Adjustable stops limit the rotation of the gates, allowing rotation from the position shown in FIG. 1, clockwise in the case of the obstructing gate 12 and counterclockwise in the case of the following gate 13. A finger 24 is pivotally mounted on the inner vertical member 16 of the following arm. Relative motion between the two gates is brought about by rod 14 whose length can be adjusted using turnbuckle 21 and which is connected to each of the arms 15. The connection of the rod 14 and the arms 15 is through a flexible and adjustable joint. The joint involves a tightenable fastener 22 passing through the end of the rod 14 and through an elongated slot 23 in the arms 15. The joints are secured at a position on the arms so that the distance between the joint and the pivot line of the obstructing gate is greater than that of the following gate. The result, due to the fixed length of the rod 14, is that angular rotation of the obstructing gate 12 causes a more rapid angular rotation in the following gate 13. Adjustment of the ratio of angular rotation can be accomplished by resetting the position of one of the fasteners 22 in their slots 23.

Figure 4:
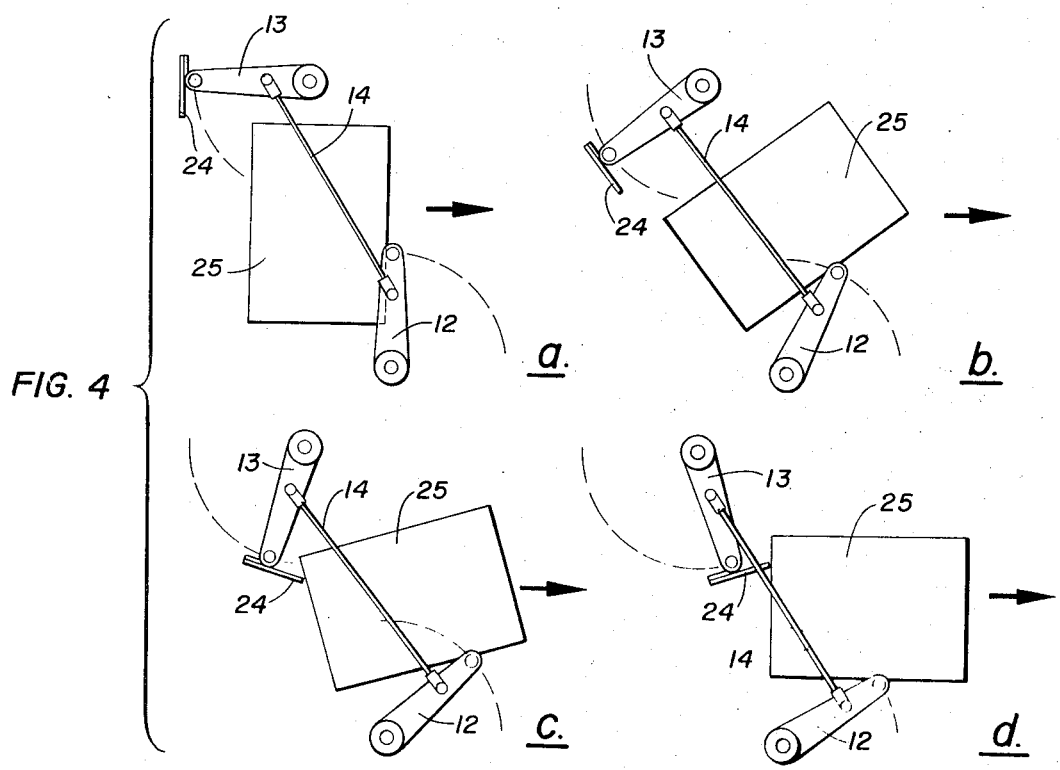
FIG. 4 is a figurative representation showing the operation of the device.

The use and operation of the invention will now be readily understood in view of the above description. As shown in view "a" of FIG. 4, the article, moving to the right, contacts obstruction gate 12. In view "b" the obstruction gate 12 is pushed aside by the article 25. The gate, in turn, cams the article around and rapidly draws in the following gate 13. The operation continues through view "c" to view "d," where the following gate contacts the article, and makes the final alignment. The article then moves on and allows the device to return to its initial condition.

It is obvious that minor changes may be made in the form and construction of the invention without departing from the material spirit thereof. It is not, however, desired to confine the invention to the exact form herein shown and described, but it is desired to include all such as properly come within the scope claimed.

The invention having been thus described, what is claimed as new and desired to secure by letters Patent is:

I claim:

1. An article handling device for orienting an item which is being moved in a direction along a path by a conveyor, comprising
   a. a first manipulator pivoted at a first pivot point for movement from a first position, in the path of the item, to a second position, out of the path of the item, the first manipulator normally resting in its first position, but moved from its first position by contact with the item as the item is conveyed,
   b. a second manipulator pivoted at a second pivot point for movement from a first position, out of the path of the item, to a second position, in the path of the item, the second manipulator normally resting in its first position, and
   c. a connector which causes the two manipulators to move simultaneously.

2. A device as recited in claim 1, wherein a biasing means is provided, which biases the manipulators toward their first positions.

3. A device as recited in claim 1, wherein motion of the manipulators from their first to second positions has a component in the direction the item is conveyed.

4. A device as recited in claim 1, wherein the connector makes constant the distance between a point on the first manipulator and a point on the second manipulator.

5. A device as recited in claim 1, wherein the connector makes constant the distance between a point on the first manipulator and a point on the second manipulator, and the point on the first manipulator is farther from the first pivot point, then the point on the second manipulator is from the second pivot point.

6. A device as recited in claim 1, wherein the said movement of the second manipulator from its first to its second position takes place at a speed that is greater than the speed of the first manipulator as it moves from its first to its second position.

7. A device as recited in claim 1, wherein the conveying of the article provides all the power for its orientation.

8. A device as recited in claim 1, wherein an articulated finger is provided on the second manipulator and contacts the article.

9. A device as recited in claim 1, wherein the connector is joined to each of the manipulators at a point on the manipulators which is easily varied.

* * * * *